| | | |
|---|---|---|
| **United States Patent** | [15] | **3,683,342** |
| **Koesler** | [45] | **Aug. 8, 1972** |

[54] FIXED VALUE STORER

[72] Inventor: Erwin Koesler, Munich, Germany

[73] Assignee: Siemens Aktiengesellschaft, Berlin and Munich, Germany

[22] Filed: Aug. 21, 1970

[21] Appl. No.: 66,029

[30] Foreign Application Priority Data

Aug. 26, 1969 Germany..........P 19 43 394.4

[52] U.S. Cl.........340/174 SP, 340/174 M, 340/174 S

[51] Int. Cl.............................................G11c 17/00

[58] Field of Search.................................340/174 SP

[56] References Cited

UNITED STATES PATENTS

| | | |
|---|---|---|
| 3,370,281 | 2/1968 | Susumu Seki........340/174 SP |
| 3,548,390 | 12/1970 | Takashi Furuoya..340/174 SP |

*Primary Examiner*—James W. Moffitt
*Attorney*—Hill, Sherman, Meroni, Gross & Simpson

[57] ABSTRACT

A fixed value storer, utilizing a plurality of word lines and a plurality of read lines which intersect the word lines, and in which a magnetic coupling is produced at the intersections of word and read lines for the storage of information, whereby the magnetic field produced by a current through a word line is distorted by the presence of a coupling member of magnetic material cooperable with such lines to produce read signals in the respective read lines, in which a multi-layer circuit board has a magnetic layer and an insulating foil disposed on each magnetic layer and having word and read lines disposed thereon insulated from one another, a data carrier disposed on the exposed face of each foil, each data carrier having magnetic coupling members disposed thereon, arranged in accordance with the information to be stored, at the respective intersections of word and read lines at the face of such carrier adjacent the cooperable foil, a pressure plate for each data carrier disposed at the outer face thereof for applying pressure to the latter and the cooperable foil, and an intermediate layer of a resilient material disposed between each pressure plate and cooperable data carrier for uniformly distributing the pressure so applied, common means being employed where pressure plates are disposed at each side of the circuit board for exerting pressure on both plates.

9 Claims, 4 Drawing Figures

INVENTOR
Erwin Koesler

BY Hill, Sherman, Meroni, Gross & Simpson ATTYS.

INVENTOR
Erwin Koesler
BY Hill, Sherman, Meroni, Gross & Simpson ATTYS.

INVENTOR
Erwin Koesler

BY Hill, Sherman, Meroni, Gross & Simpson ATTYS

FIXED VALUE STORER

BACKGROUND OF THE INVENTION

The invention relates to a fixed value storer employing parallel word lines and parallel read lines which are arranged orthogonally to each other and separated from one another by an insulating layer, with a magnetic coupling being provided at the intersection of word and read lines for the storage of information, such coupling being achieved by the use of an elongated coupling member of magnetic material which is disposed at such intersection and which extends diagonally with respect to the word and read lines.

The storage function here involved is based on an inductive coupling. A current pulse in a straight conductor, for example a word line, produces a magnetic field with ring or annular shaped magnetic field lines. No voltage is initially induced in a conductor, such as a read line, extending at right angles to the first conductor, but if the magnetic field is distorted at the intersection of both lines an inductive coupling can be obtained. This can be achieved, for example, by the utilization of a magnetizable coupling member or area which extends across the intersection of the lines involved.

The entry of information of one type, for example a binary "zero," can be represented by the absence of a coupling member at the intersection involved, while the entry of another type of information, for example, a binary "1," by the presence of a coupling member at the intersection involved. If a current pulse is then sent along the word line during a read interval, a read pulse will appear on the read line when a binary "1" is stored at the intersection of the word and read lines. In like manner absence of a pulse in the read line will designate a binary "0."

Distinction between the storage, for example of a binary "1" and a binary "0," can also be effected by selective disposition of the coupling member with respect to the intersecting lines. For example, where a binary "1" is to be stored the orientation of the elongated coupling member may be from right to left, while in the storage of a binary "0" the coupling member may be oriented from left to right, or vice versa. In this case the sign of the magnetic coupling will reverse, dependent upon the nature of the stored information, and the corresponding read signals will differ in polarity.

Such fixed value storers are already known per se. In the DAS (German published patent application) 1,216,937, there is described a semi-permanent magnetic data storer in which conductors are disposed in orthogonal relation in grooves of a plate of magnetic material, bridge members of magnetic material being suitably disposed at the desired line intersections for the designation of the storage of desired information, as a result of the magnetic coupling. The production of prior fixed value storers of this type, however, is very costly and a large space is required for storers of high capacity.

The problem of the invention thus is to provide a fixed value storer of the type described which can be produced relatively inexpensively, and at the same time have a high bit density, thus requiring a relatively small amount of space, as well as providing variable storage capacity, the storage content of which can be readily changed.

SUMMARY OF THE INVENTION

This problem is solved in the present invention by a fixed value storer in which there is provided a multiple layer printed circuit board which has magnetic layers and which has at its upper side and/or its bottom side a respective insulating foil carrying word and read lines. Cooperable with each set of word and read lines is a data carrier which is adapted to be disposed in cooperable relation on the associated insulating foil and is provided with coupling members, disposed in accordance with the information to be stored, carried at the side of the data carrier facing the associated insulating foil, with the data carrier having a pressure plate disposed at the outer face thereof and an intermediate layer of resilient material positioned between the data carrier and the pressure plate.

The magnetic layers of the circuit board are operative to increase inductive coupling of word and read lines in cooperation with the coupling members whereby the magnetic field for the word line at the location of the coupling member is concentrated, and the stray magnetic flow of the coupling member decreased.

As a result of the multilayer construction of the circuit board, the individual layers of which can be produced according to prior known methods, the space required for a storer with high capacity is quite small and the production is materially simplified.

The fixed value storer according to the invention may utilize a configuration similar to the prior known flat structural components and can, in the same manner, be inserted into a suitable support frame and readily interchanged.

BRIEF DESCRIPTION OF THE DRAWINGS

In the drawings wherein like reference characters indicate like or corresponding parts.

DETAILED DESCRIPTION OF THE INVENTION

Figure 1:
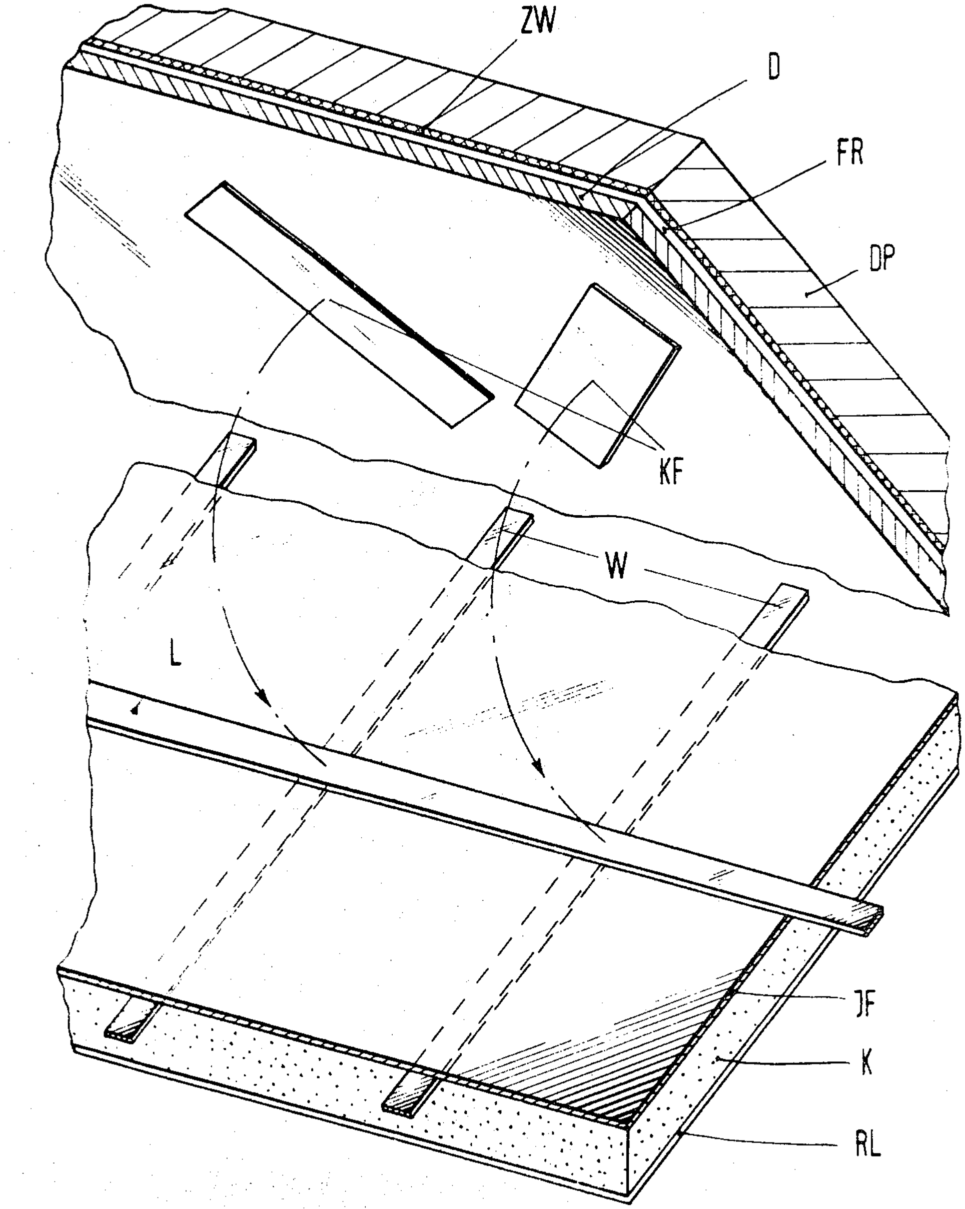
FIG. 1 is an exploded view of a portion of a storage structure utilizable in the present invention.

Referring to FIG. 1, the storage structure there illustrated comprises a magnetic layer K, on which is disposed an insulating foil IF carrying word lines W and read lines L, only one read line being illustrated. Adapted to be assembled therewith is a data carrier D which carries respective magnetic coupling members or areas KF, which are so arranged that upon assembly of the data carrier D upon the insulating foil IF the coupling members will be positioned at the crossing points or intersections of the word and read lines. Return conductors RL for the word and read lines may be disposed below the magnetic layer K. A layer FR of electrically conductive material, for example copper, may be disposed between the data carrier D and the pressure plate DP, which is provided to push back or restrict the magnetic field, which may be produced by a current through the word line W, in a direction toward the magnetic layer K, whereby the magnetic coupling between the word and read lines is improved. The magnetic layer K and the insulating foil IF, along with the word and read lines carried thereby may be constructed in the form of a multi-layer printed circuit board.

The pressure plate DP thus may be employed to press the data carrier D firmly upon the insulating foil IF and thus upon the word and read lines. To insure an even pressure of the data carrier D upon the insulating foil IF, an intermediate layer ZW of resilient material can be inserted between the pressure plate DP and the data carrier D. In addition, a further pressure plate (not illustrated in FIG. 1) may be disposed below the magnetic layer and connected with the upper pressure plate, as hereinafter described.

Figure 2:
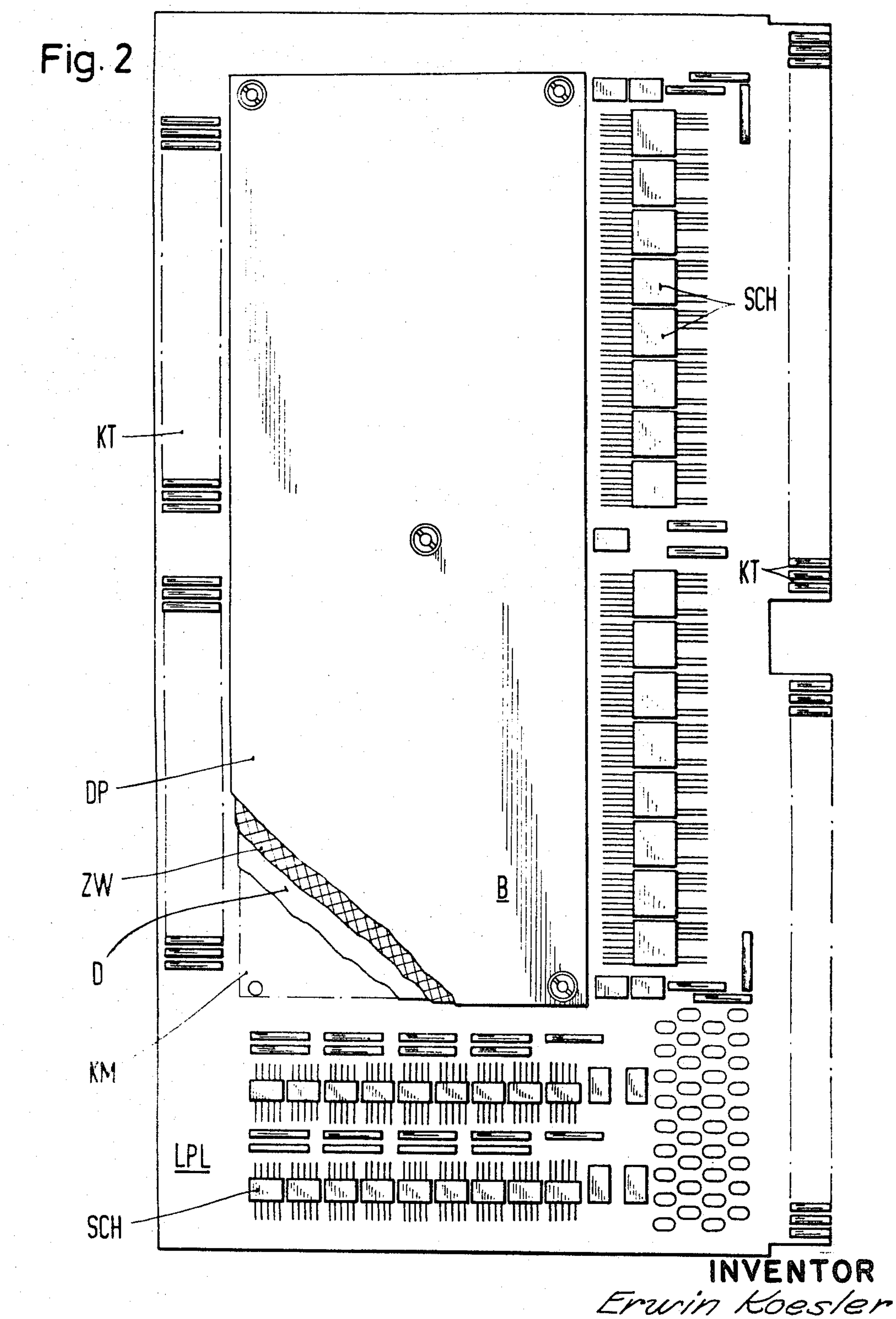
FIG. 2 is a plan view of a fixed value storer constructed in accordance with the present invention.
Figure 3:
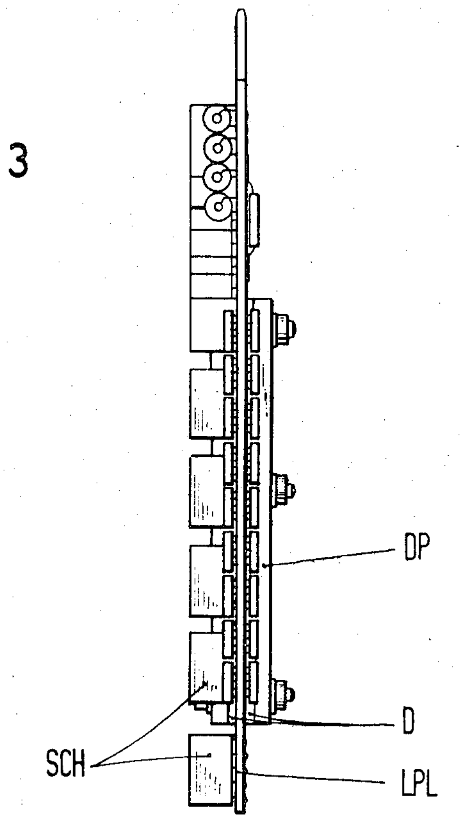
FIG. 3 is an edge view of the structure illustrated in FIG. 2.
Figure 4:
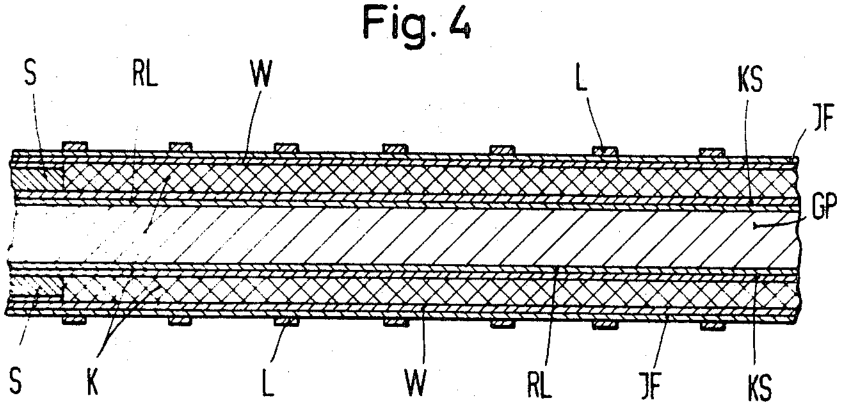
FIG. 4 is a cross section through a circuit board constructed in accordance with the present invention.

Details of construction of the fixed value storer will be apparent from a reference to FIGS. 2 and 3, in which the printed circuit board is designated LPL, details of which are illustrated in FIG. 4. As illustrated in FIG. 2, the circuit board LPL has an area B thereon in which is disposed a coupling matrix M containing intersecting word and read lines, with the area B thus representing the storage area. The word and read lines may be extended outwardly from the area B to respective control switching circuits and read switching circuits, generally indicated in FIGS. 2 and 3 by the reference letters SCH. As the control switching circuit and read switching circuits are disposed on the circuit board, the number of contact terminals KT, to which external connections are to be made, is reduced.

Disposed above the circuit board LPL in the area B there is a pressure plate DP and the intermediate layer ZW of resilient material, with the coupling matrix M and data carrier D being disposed between the pressure plate and the circuit board. As will be apparent from a reference to FIG. 3, the same construction can be duplicated at the opposite face of the circuit board LPL. The pressure plates DP on opposite sides of the circuit board can then be connected, as for example by means of suitable bolts or the like, thereby insuring that the data carriers D are pressed firmly upon the respective coupling matrix KM.

Referring to FIG. 4, which represents a section through the circuit board in the area B, such circuit board comprises a base plate GP of insulating material, for example an epoxide-glass hard sheet or plate. The conductors RL for the return paths of the word and read lines may be arranged on the top and bottom faces of the base plate GP and the remainder of the construction thereof may be symmetrical at opposite sides of the base plate whereby merely one side thereof will be described.

The magnetic layer K may be secured to the face of the base plate GP by means of an adhesive layer KS. The magnetic layer K can, for example be constructed of a ferrite epoxide and the size thereof may be comparable to the corresponding dimensions of the area B and the data carrier D. Exteriorly of this area insulating layers, designated by the reference numeral S, may be substituted for the magnetic layer K. Disposed on the magnetic layer K is an insulating foil IF, carrying the word and read lines forming the coupling matrix in the area B. Such lines, extending over the remaining area of the circuit board LPL form connection lines to the respective control switching circuits and the read switching circuits, or to the terminal contacts KT. As previously mentioned, to insure a good connection between the insulating foil IF and the magnetic layer K, an adhesive layer KS can be disposed therebetween. However, it is advantageous to utilize the same binding agent such as the epoxide resin employed in the magnetic layer, for adhesion of the insulating foil, whereby the insulating foil and the magnetic layer will be directly connected with each other without the use of an additional separate adhesive layer.

In the production of a coupling matrix, such as illustrated, methods known in the prior art may be employed. For example the word and read lines may be etched from metallic layers provided on the insulating foil IF, or by another suitable process. Likewise, the magnetic layer K may be constructed from ferrite powder employing a binding agent such as epoxide resin.

The production of the data carrier and coupling members thereon can also be effected by methods known in the prior art, for example with the utilization of a screen printing, employing a soft-magnetic paint, or by the etching of the coupling areas or members from a layer of highly permeable metal alloy.

It will be appreciated that the circuit board LPL does not have to be designed symmetrically on opposite sides thereof as it may be desirable to employ different layer designs on opposite sides or to employ the layers only at one side of the base plate GP. Likewise, the area B, illustrated in FIG. 2, can be divided or arranged differently at opposite sides in dependence upon requirements. For example the coupling matrix KM can be divided into two or more parts.

It will be apparent from the above description that various immaterial modifications may be made in the same without departing from the spirit of the invention.

What is claimed is:

1. A fixed value storer, utilizing a plurality of word lines and a plurality of read lines which intersect the word lines, and in which a magnetic coupling is produced at the intersections of word and read lines for the storage of information, whereby the magnetic field produced by a current through a word line is distorted by the presence of a coupling member of magnetic material cooperable with such lines to produce read signals in the respective read lines, comprising a multilayer circuit board having a magnetic layer and read lines disposed at opposite sides of an insulating foil and thereby insulated from one another, with said word and read lines having crossing points at which the read lines extend transversely to the word lines, in relatively inductively uncoupled relation thereat, a data carrier disposed on the exposed face of said foil, said data carrier having magnetic coupling members disposed thereon, arranged in accordance with the information to be stored, at respective crossing points of word and read lines at the face of said carrier adjacent said foil to provide a distortion of the magnetic field thereat to effect an inductive coupling between the associated word and read lines, a pressure plate disposed at the outer face of said data carrier, for applying pressure to the latter and said foil, and an intermediate layer of a resilient material disposed between said pressure plate and said data carrier for uniformly distributing the pressure so applied.

2. A fixed value storer according to claim 1, wherein the size of the magnetic layer corresponds to the size of the data carrier which is applied thereto, and an insulating layer is disposed on the circuit board laterally exteriorly of the area of said magnetic layer and the data carrier.

3. A fixed value storer, according to claim 1, wherein an adhesive layer is disposed between the insulating foil and the magnetic layer.

4. A fixed value storer according to claim 1, wherein the control and read switching circuits are disposed on the insulating foil for the word and read lines.

5. A fixed value storer according to claim 1, wherein the magnetic layer consists of ferrite powder.

6. A fixed value storer according to claim 1 wherein the magnetic layer and the insulating foil contains the same binding agent, whereby no separate adhesive layer is necessary for adhering of the magnetic layer with the insulating foil.

7. A fixed value storer according to claim 6, wherein that the binding agent is epoxide resin.

8. A fixed value storer according to claim 1, wherein said circuit board has a storage structure at each side thereof and comprises a base plate made of insulating material, a magnetic layer being disposed at each side of said base plate, respective word and read line-carrying foils being disposed on the face of each magnetic layer, and adhesive means for securing each foil to the face of the adjacent magnetic layer.

9. A fixed value storer according to claim 8, wherein said storage structures are disposed at opposite sides of a common area of said base plate, with the respective data carriers therefor disposed in opposing relation, and means common to both of said data carriers operative to apply compression forces therebetween.

* * * * *